Aug. 23, 1960 R. H. OLSON ET AL 2,949,701
APPARATUS FOR ALIGNING GLASS FORMING MOLDS
Filed Sept. 14, 1955 7 Sheets-Sheet 4
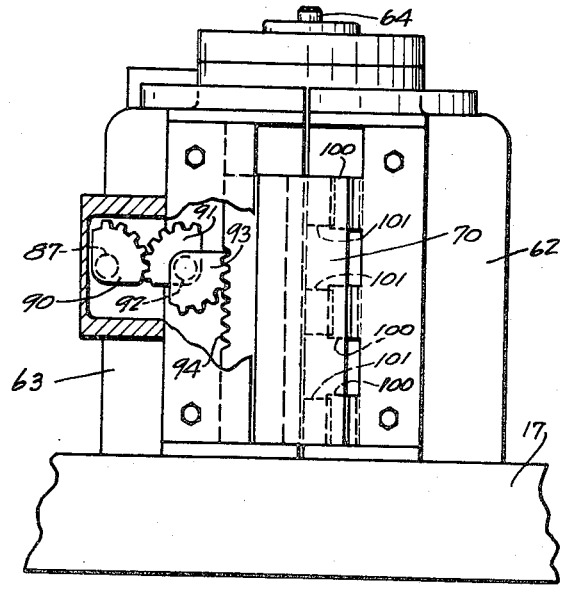
FIG-6
FIG-7
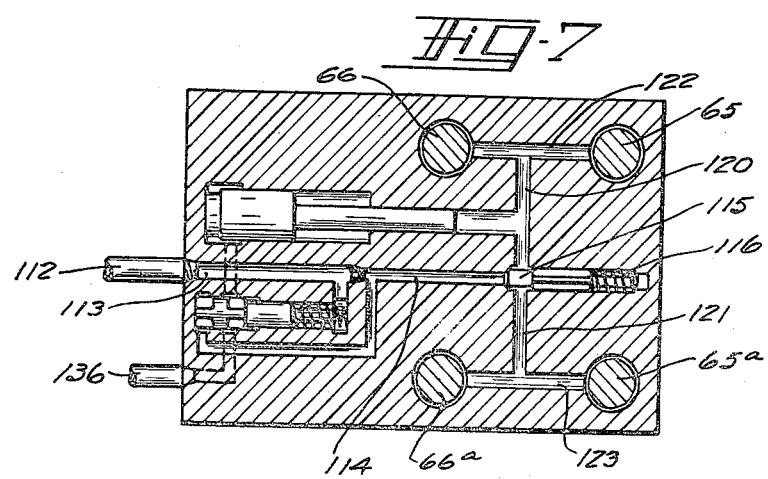
INVENTOR
RALPH H. OLSON
URBAN P. TRUDEAU
BY W. A. Pcharich
Leonard S. Douchi
ATTORNEYS Aug. 23, 1960    R. H. OLSON ET AL    2,949,701
APPARATUS FOR ALIGNING GLASS FORMING MOLDS
Filed Sept. 14, 1955    7 Sheets-Sheet 5

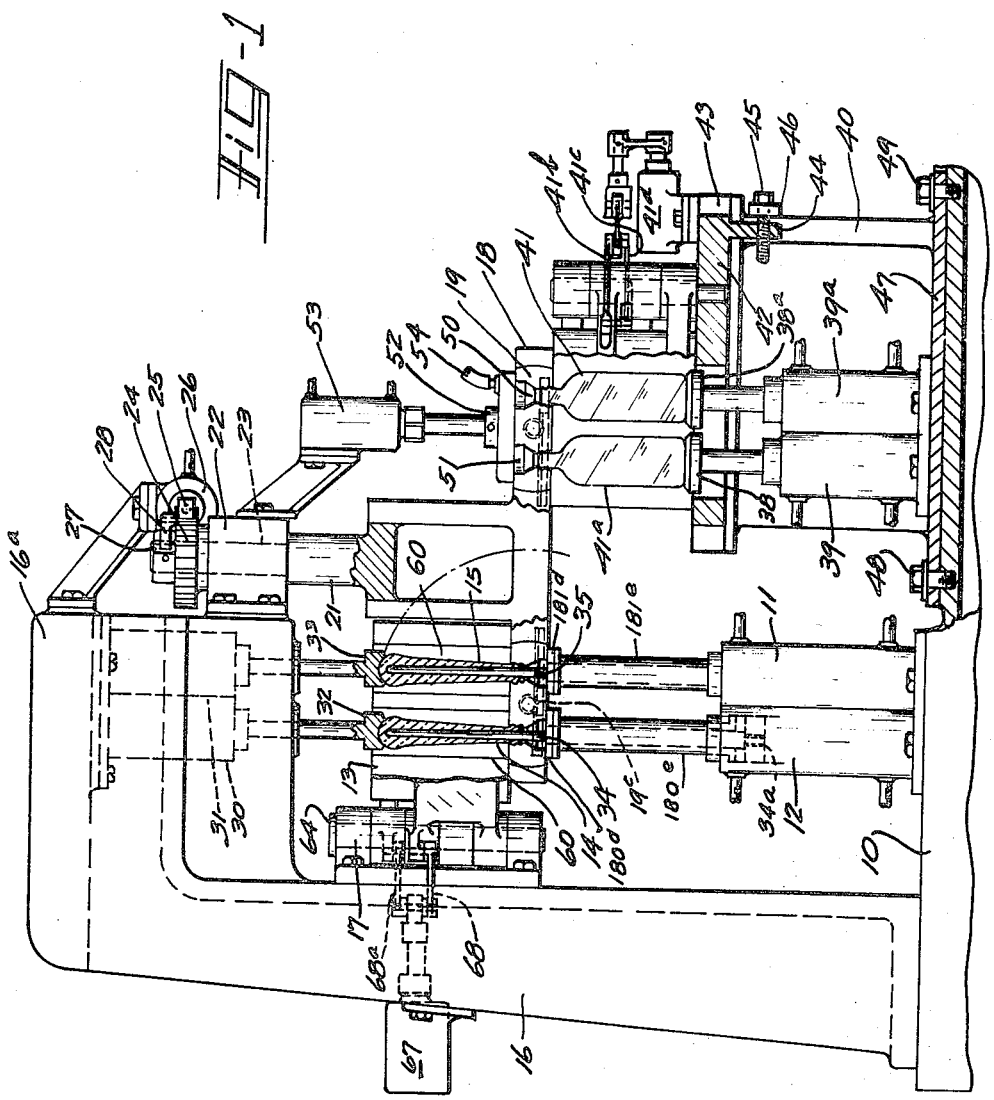

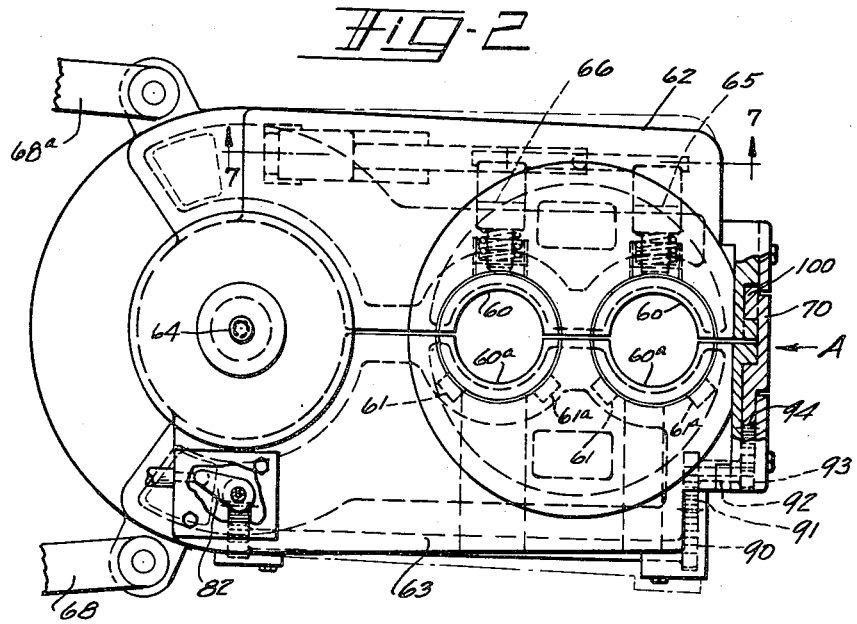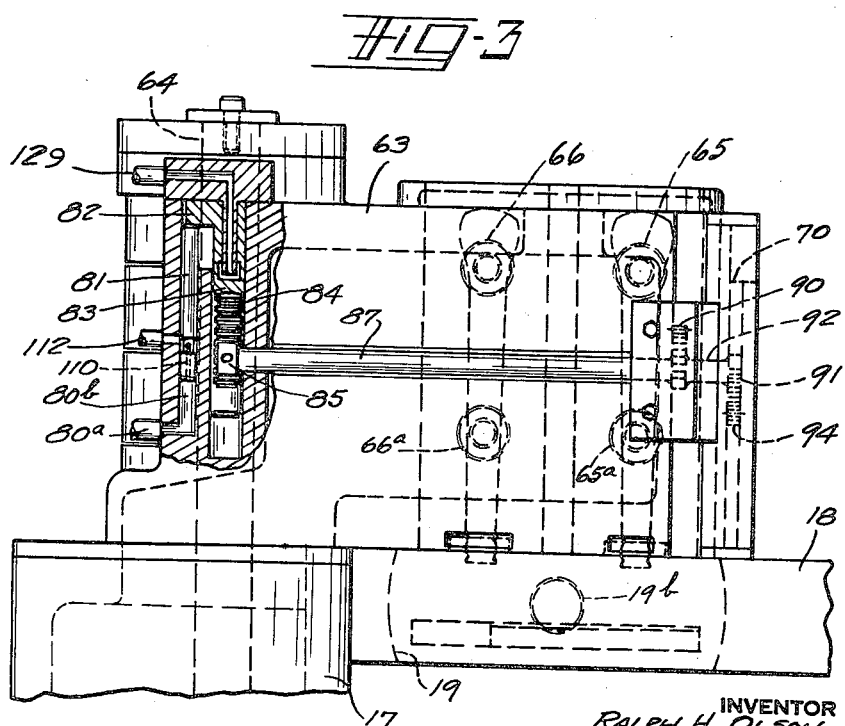

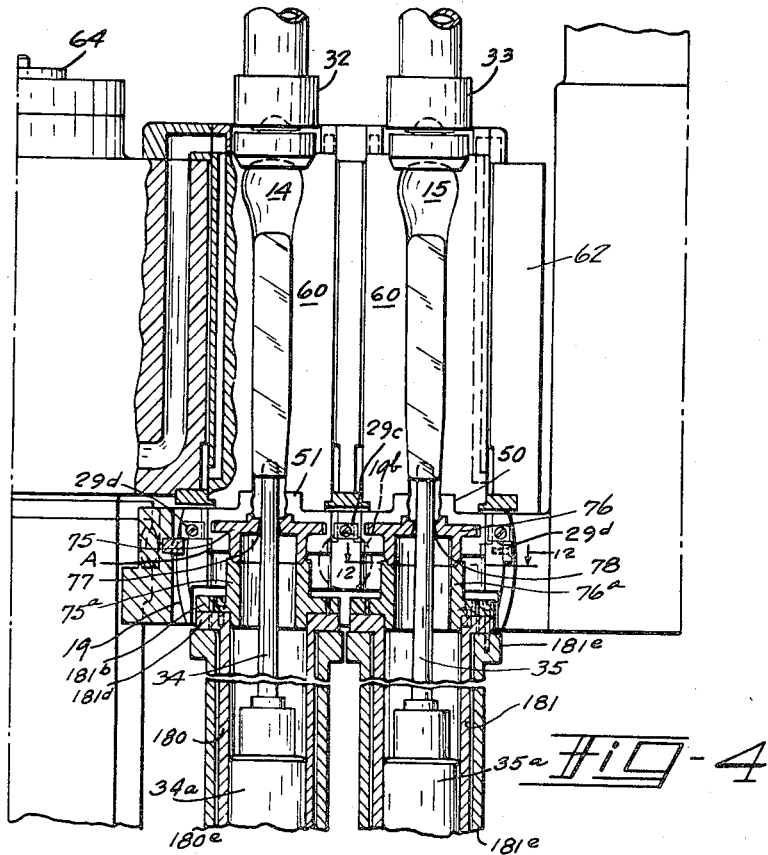
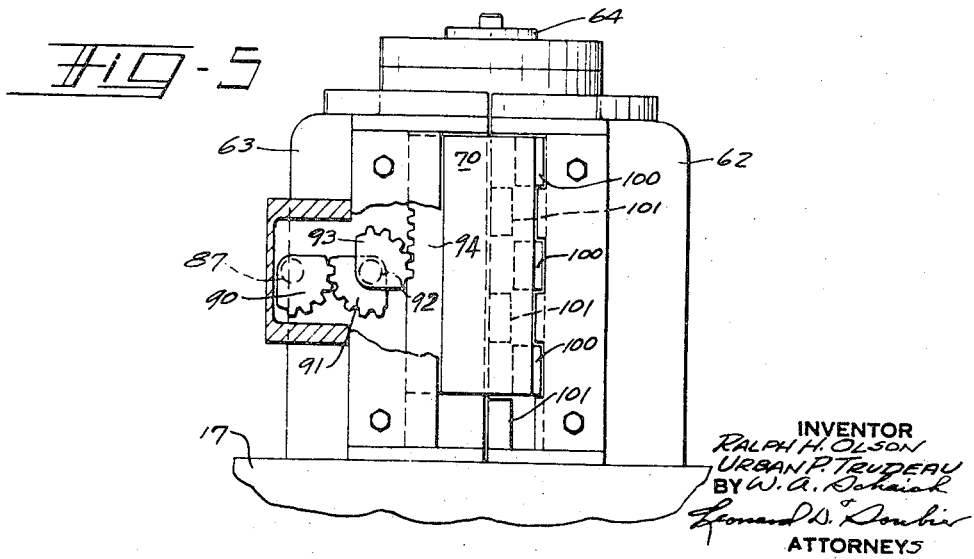

INVENTOR.
RALPH H. OLSON
URBAN P. TRUDEAU
BY W. A. Schaich
Leonard D. Doubis
ATTORNEYS

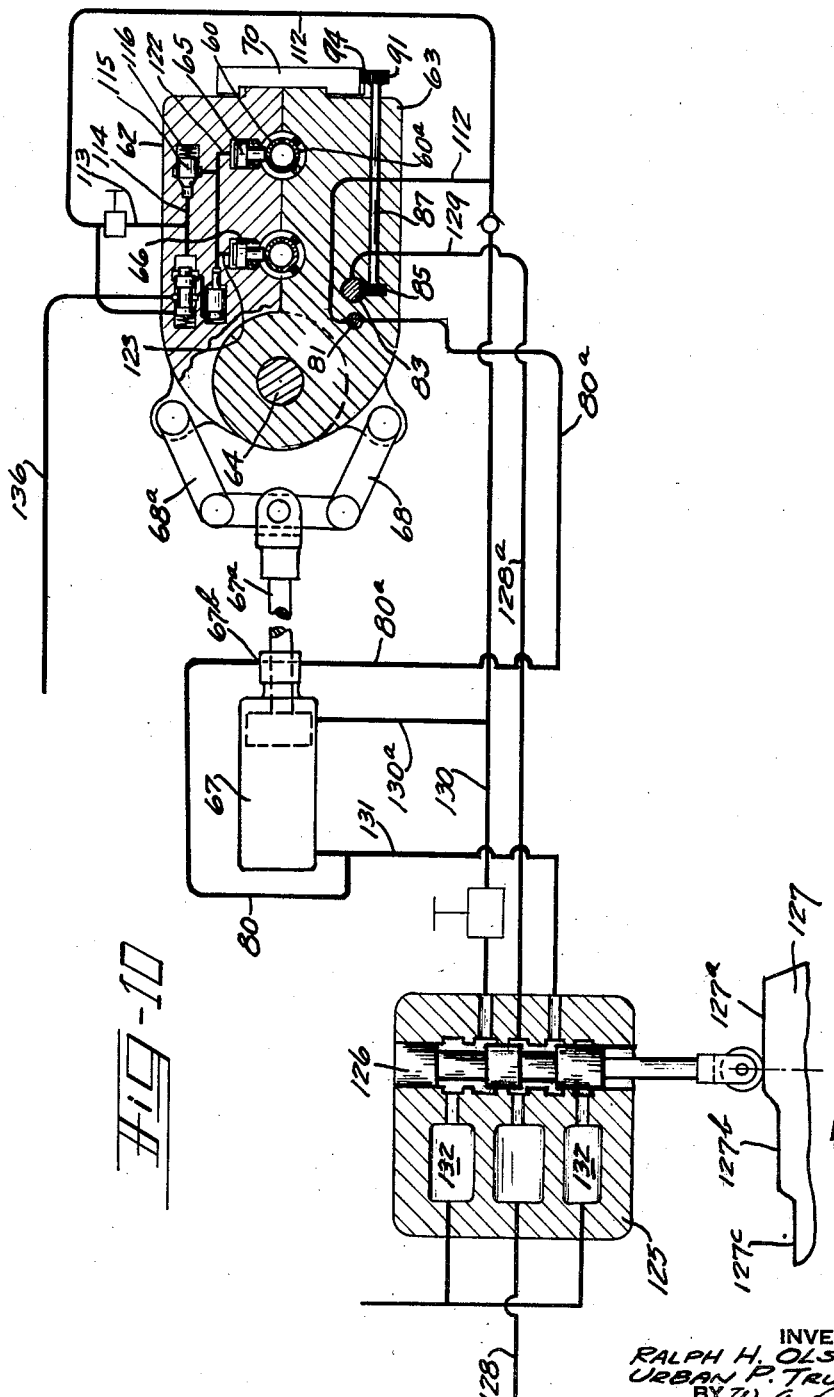

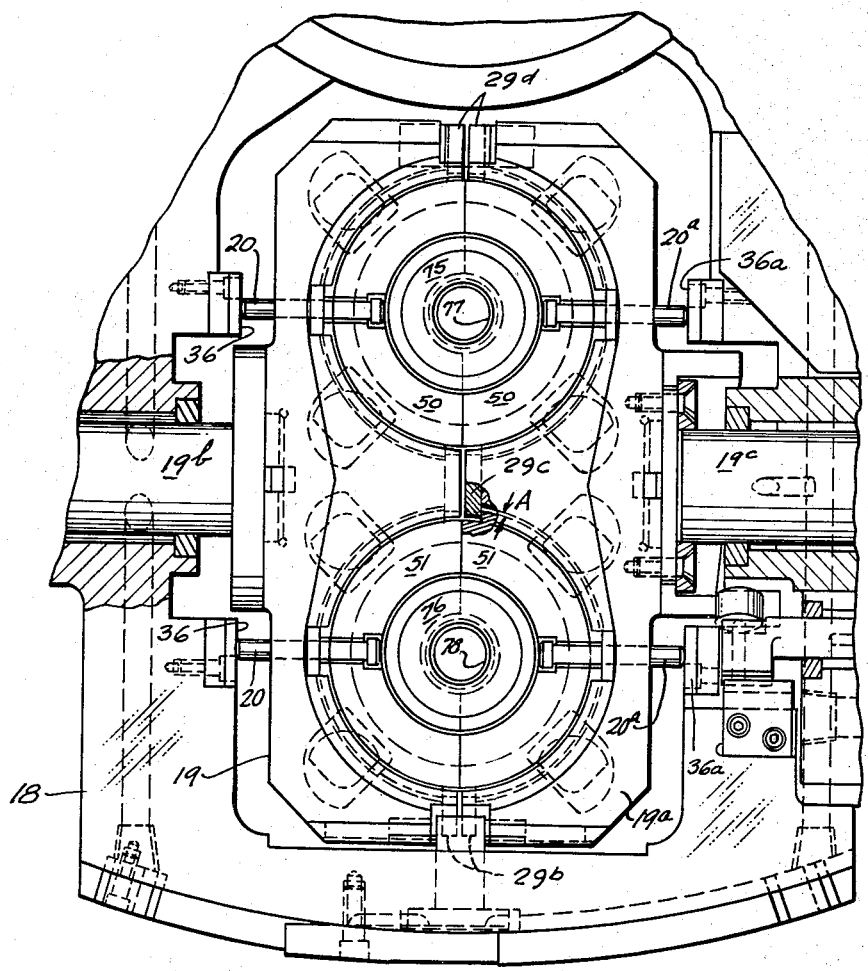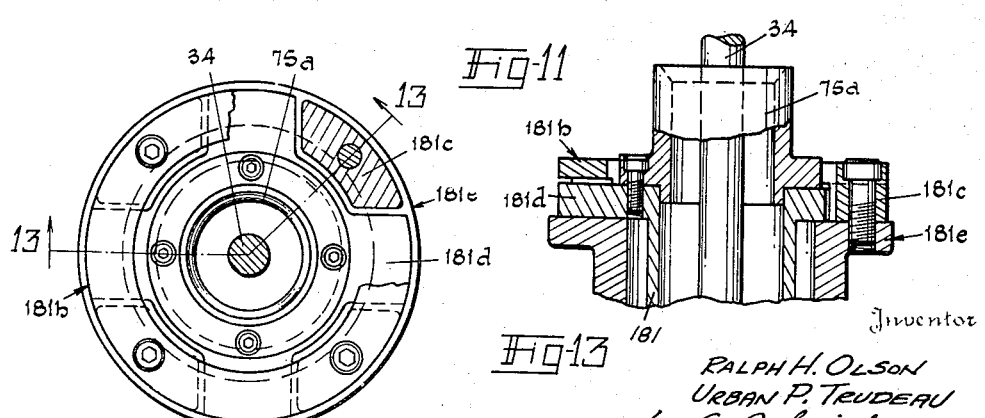

United States Patent Office 2,949,701
Patented Aug. 23, 1960

2,949,701

APPARATUS FOR ALIGNING GLASS FORMING MOLDS

Ralph H. Olson and Urban P. Trudeau, Toledo, Ohio, assignors to Owens-Illinois Glass Company, a corporation of Ohio Filed Sept. 14, 1955, Ser. No. 534,265

2 Claims. (Cl. 49—9)

The present invention relates to apparatus for aligning the molding and shaping elements of a glass forming machine prior to and during the stage of the molding of the molten glass in the forming molds by the application of a molding and retaining pressure, either positive or pneumatic.

In the present instance the application of this invention is described and illustrated in connection with the pressing of charges of molten glass into hollow parisons for subsequent blowing into hollow articles.

It is the main object of this invention to supply an assembly of molding and shaping mechanisms which will permit certain molding elements of a molding assembly to move freely in one direction, while other molding elements thereof are permitted to move only in a direction at right angles to the first-mentioned movement, and wherein a shaping element or elements may move freely in both directions.

It is a further object to provide apparatus for floating all of the molding elements in a plurality of directions relative to each other in order that a perfect vertical alignment of all of the molding and shaping elements may be obtained and maintained.

Other objects will be in part apparent and in part pointed out hereinafter.

In the drawings:

Fig. 1 is a part sectional elevation through a glass bottle forming machine to which the present invention is adapted;

Fig. 2 is a plan view of the blank mold mounting;

Fig. 3 is a part sectional side elevation of the blank mold mounting;

Fig. 4 is a part sectional elevational view of the blank molds, neck molds, and press plungers in cooperative position;

Fig. 5 is a view in the direction of arrow A on Fig. 2 showing the mold arm lock in open position;

Fig. 6 is a view in the direction of arrow A on Fig. 2 showing the mold arm lock in closed position;

Fig. 7 is a sectional view taken at line 7—7 on Fig. 2 showing the fluid control conduits for applying pressure to the blank mold halves;

Fig. 10 is a schematic view of the fluid control for opening and closing the blank molds, locking the mold arms in closed position and applying closing pressure to the blank mold halves.

Figure 8:
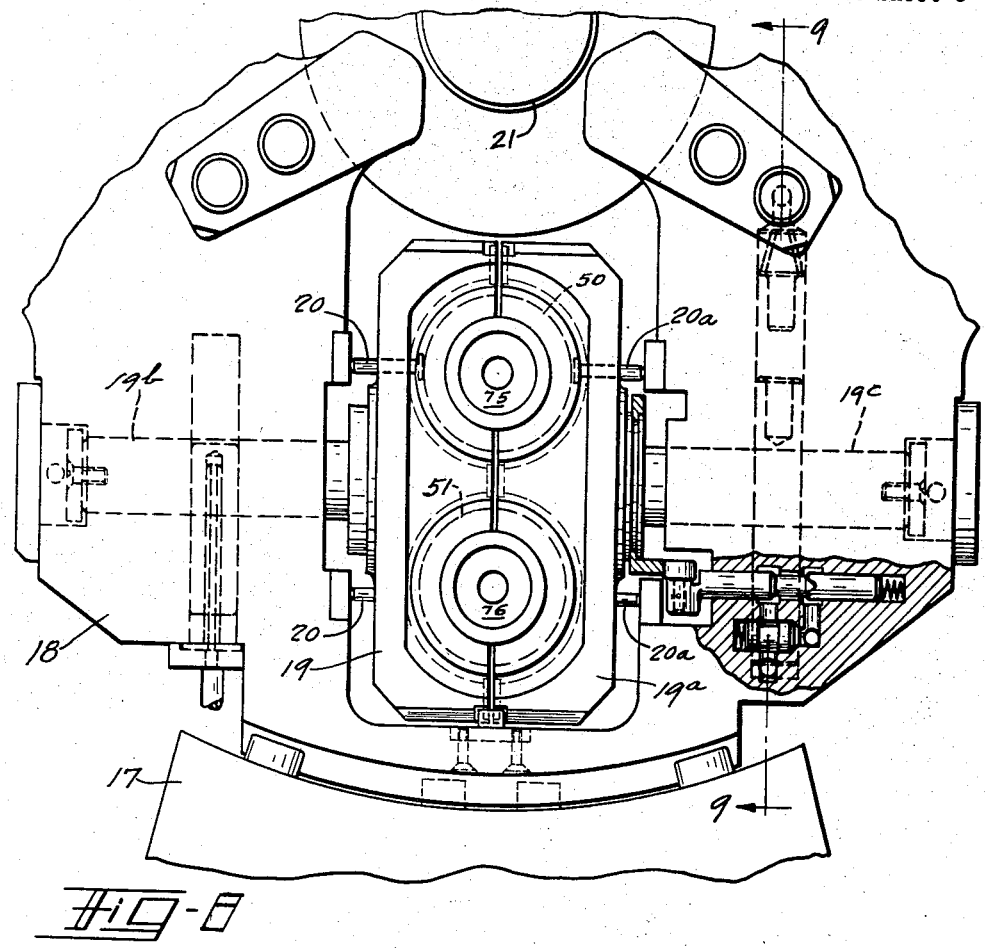
Fig. 8 is a plan view of the neck molds and their mounting.
Figure 9:
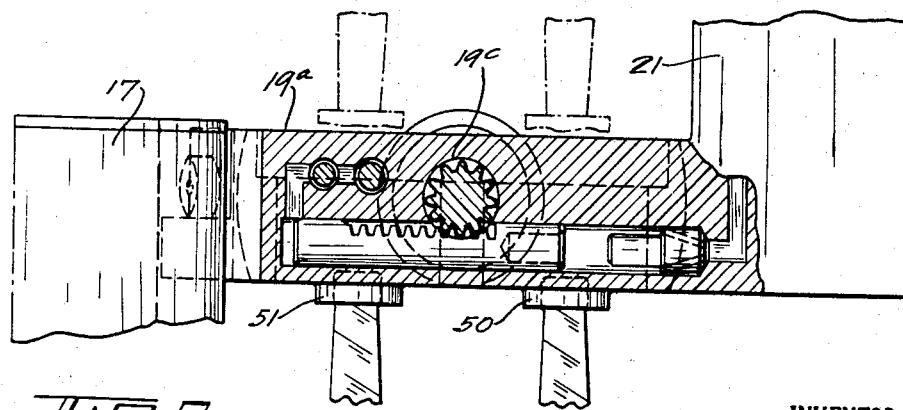
Fig. 9 is a sectional view of the neck mold inverting mechanism taken at 9—9 on Fig. 8.

Fig. 11 is a bottom view of the neck molds and their mounting looking upwardly at the mechanism shown in Fig. 8, Fig. 12 is a plan view of the neck mold and pressing plunger aligning means taken at line 12—12 on Fig. 4 and Fig. 13 is a sectional elevational view taken at line 13—13 on Fig. 12 and illustrating the structure which permits the press plungers to float about their vertical center lines.

Referring to the drawings, and in particular, Fig. 1, 10 indicates a base upon which is mounted a pair of cylinders 11 and 12 adapted to move parison forming plungers into operating position with respect to a pair of cavities 14 and 15 formed in a blank mold 13.

The blank mold 13 is mounted upon a vertical support member 16 in a hinge member 17 and in such position that it may cooperate with a rotary turret 18 mounting a series of neck mold holders 19 and 19a equally spaced about the circumference thereof. The neck mold holders are adapted for inversion about horizontal shafts 19b and 19c. This turret 18 is pendant from a vertical shaft 21 which is mounted in a vertical bearing 22 mounted upon an extension 16a of the upper end of the support 16. An extension 23 of the shaft 21, has attached thereto a gear 24 adapted to mesh with a drive rack 25 which in turn is adapted to be actuated by a fluid motor 26. The timing mechanism for actuation of the various fluid motors in this mechanism forms no part of the present invention and is not shown, but it may be in any of the various well-known forms.

The rotation of the turret 18 is only in one direction and is accomplished through rack 25 and gear 24. Upon the return of the rack 25, the gear 24 rotates freely on shaft 21 due to the release of pawl 27 from ratchet 28. Through this mechanism the turret 18 may be rotated intermittently in one direction to move the neck molds successively from a pressing position, to a blowing position and ultimately to a ware discharge position.

Mounted on the upper portion 16a of the support 16, is a pair of cylinders 30 and 31, the pistons of which carry at their lower extremities, a pair of baffle plates 32 and 33 adapted for aligning cooperation with the open top ends of the blank forming cavities 14 and 15. These baffles are adapted to close the open upper ends of these cavities during the pressing of a glass parison therein by the thrusting of a pair of press plungers 34 and 35 into the molten glass contained in said cavities.

Mounted to one side of the pressing station is a table 40 which supports a blow mold having a pair of cavities 41 and 41a formed therein. The blow mold is mounted upon a slide 42 which in turn is mounted in a slideway 43 formed on the upper end of table 40. Pendant from one end of slide 42 is a lug 44 which has a screw thread connection with an adjusting screw 45 mounted on a cross member 46 on table 40. Bottom plates 38 and 38a, also mounted on table 40, are adapted for movement to and from cooperative position with the blow mold by air motors 39 and 39a. The blow mold cavities 41 and 41a are so positioned that the upper ends thereof are in alignment with the bottom surface of the turret 18 and are adapted to be brought into vertical alignment with the neck mold cavities 50 and 51 when the turret is at rest at the blowing station. The blow mold may be opened and closed by the usual air motor 41d and links 41b and 41c.

The table 40 has a base plate portion 47 which is fulcrumed at 48 on the machine base 10. A locking screw 49 permits the plate 47 to be adjusted angularly around the fulcrum 48, the vertical center of which coincides with the vertical center of the turret 18. This permits radial alignment of the cavities 41 and 41a with the neck mold cavities 50 and 51.

A blow head 52 mounted on support 16a is adapted for movement to and from blowing position on the turret 18 by an air motor 53 and blowing air is supplied thereto through a pipeline 54.

In the blank mold structure, the inserts 60 and 60a which form the cavities 14 and 15, are adapted for horizontal movement relative to their respective holders 62 and 63, while the holders are also adapted for horizontal motion around their hinge pin center post 64. The mold holders 62 and 63 may be opened and closed by the usual air motor 67 and links 68 and 68ª.

Referring particularly to Fig. 4, the neck molds 50 and 51 are shown with the mold holders 62 and 63 and inserts 60 and 60ª closed thereabout, and in aligned position. In this particular instance the mold holders 62 and 63 shift as a unit about the vertical center line of the mold post 64 to accommodate them as a unit to the radial positioning of the neck molds 50 and 51. The neck molds 50 and 51 are adapted for limited radial shifting in the holders 19, and 19ª along a radial line running through the center of shaft 21 and the center of the two molds 50 and 51. Such radial shifting can only be of the order of the dimension "A" on Figs. 4 and 11 and only along the radial line because of the restriction provided both by the stops 29ᵇ, 29ᶜ and 29ᵈ, attached to the holders 19 and 19ª, and the oppositely disposed pins 20 and 20ª.

At this time a locking member 70 for mold holders 62 and 63 is in the open position, as shown in Fig. 5 and is to be moved to a locking position as in Fig. 6, thus locking the mold holders 62 and 63 together to form a single unit. Due to the fact that the neck molds are not adapted for horizontal movement in the same direction as the mold holder unit, the mold holder unit therefore must move about the mold post 64, and accommodate itself to the position of the neck molds. The mold locking member 70 is fluid actuated and controlled in its operation by any usual or normal cam control system (not shown). When fluid enters the line 80ª to chamber 80ᵇ (Fig. 3) beneath piston 81, this piston is moved upwardly and through its free contact with extension 82 of rack 83 causes the rack 83 to move upwardly. Teeth 84 of the rack are in mesh with a sector pinion 85 attached to shaft 87 and causes the shaft to rotate counter clockwise. A second sector pinion 90 attached to the opposite end of shaft 87 is in mesh with a sector pinion 91 mounted on a second horizontal shaft 92 mounted in the forward end of mold holder 63. A further sector pinion 93 is attached to the outer end of shaft 92 and is in mesh with a vertical rack 94 formed on the lock member 70. Thus, when shaft 87 is rotated counter clockwise, the shaft 92 through pinion 91, is rotated clockwise, moving the rack 94 vertically downward carrying the lugs 100 on member 70 into locking position behind corresponding lugs 101 formed on the mold holder member 62, thus locking the holders 62 and 63 together as a unit capable of movement about the fulcrum 64.

The opening and closing of the mold holders 62 and 63, the locking and unlocking movement of the member 70, and the clamping of the inserts 60 and 60ª is accomplished through a fluid pressure mechanism which is controlled through a valve block 125, valve 126 and a cam 127. The cam 127 may be of conventional form, i.e., a circular type cam mounted on a cam shaft (not shown) driven by any conventional means. A main pressure line 128 provides pressure fluid to block 125 and starting with the valve parts in the position shown in Fig. 10, the cam 127ª positions the valve 126 in the position which permits pressure fluid to enter line 131 to cylinder 67 and close the mold arms 62 and 63.

As piston 67ª reaches the end of its mold closing stroke, it opens a part 67ᵇ permitting fluid from line 80 to flow through line 80ª, to actuate piston 81, move lock member 70 into locking position as above described, and thence through line 112 to pistons 65, 65ª, 66, and 66ª, to hold mold inserts 60 and 60ª in closed position against the stops 61 and 61ª.

With the completion of the molding operation, the valve 126 is shifted to cam 127ᵇ to open lines 131 and 130 to exhaust chambers 132. This releases the pressure on pistons 65, 65ª, 66, 66ª, 67ª, and 81. This release of pressure permits ease of movement of lock member 70 which will immediately move to unlocked position due to the constant pressure through line 128ª. At this time valve 126 moves to the control of cam 127ᶜ, passing fluid to lines 130 and 130ª to cylinder 67, and permits cylinder 67 to open the mold arms 62 and 63. It will be noted that valve 126 permits constant pressure to pass continuously through the block from line 128 to line 128ª and line 129 to the top of the rack member 83, causing it to move downwardly whenever pressure to line 80 is stopped. Through pinion 85, shaft 87, pinion 91 and rack 94, the lock member 70 is also moved to unlocked position when this pressure is stopped. Line 136 permits drainage of oil from behind the pistons 65 and 66.

With the mold locking parts in locking position as in Fig. 3, the fluid flows from chamber 80ᵇ through opening 110 to line 112 (Figs. 3 and 7) to conduits 113 and 114 and pushes valve 115 open against spring 116, permitting fluid to enter conduits 120, 121, 122, and 123 to enter behind pistons 65, 66, 65ª, and 66ª to apply closing pressure against the mold cavity inserts 60 and 60ª. The application of this pressure to these inserts, closes them tightly around the neck molds 50 and 51, which have no horizontal movement about the fulcrum 64 and thus cause the locked mold holders 62 and 63 to move around the fulcrum 64 and accommodate itself as a unit to the radial location of the neck molds. The neck molds 50 and 51 and the guides 75 and 76 have only radial movement during the alignment period and while the blank molds do not and therefore at the time of closing of said molds, the neck molds and guides move radially inward or outward with respect to fulcrum 64, and accommodate themselves to the set radial location of the blank mold cavities 14 and 15. Pins 20 and 20ª controlled by the cam plates 36 and 36ª prevent the guides 75 and 76 from moving in any direction other than radially with the neck molds 50 and 51. The application of fluid pressure to the pistons 65, 65ª, 66, and 66ª provides a means of locking the molding and shaping elements into a single unit structure.

During all of the preceding alignment moves of the various mold elements, the guide members 75 and 76 and guide supports 75ª and 76ª respectively, move or float horizontally with the neck molds 50 and 51, thus causing the guide openings 77 and 78 to always be in vertical alignment with the cavities 14 and 15. The guide supports 75ª and 76ª are bolted to the sleeves 180 and 181 respectively, and as these sleeves are adapted to float about their vertical center lines, they also are permitted to float or move horizontally with the neck molds 50 and 51, thus maintaining all the cooperating parts in the desired vertical alignment prior to and during the operation of shaping and forming the parison or blank.

By referring to Figs. 4, 12 and 13, it will be observed that sleeves 180, 181 are loosely mounted in outer sleeves 180ᵉ and 181ᵉ, and as previously explained, are floatingly guided therein. Figs. 12 and 13 illustrate the manner in which the upper end of sleeve 181 is mounted on sleeve 181ᵉ, it being understood that this arrangement is duplicated for sleeves 180, 180ᵉ. Sleeve 181 is provided with four radial projections 181ᵈ which extend radially outwardly over and rest on the upper end of sleeve 181ᵉ. A locking ring 181ᵇ is spaced from sleeve 181ᵉ by means of segmental inserts 181ᶜ interposed between projections 181ᵈ, these inserts being somewhat thicker than the projections. When ring 181ᵇ is bolted to sleeve 181ᵉ as shown the projections are not clamped between the locking ring and sleeve 181ᵉ so that the inner sleeve 181 is free to float horizontally with respect to outer sleeve 181ᵉ. Since the guide support 76ª is bolted to sleeve 181 it, as well as guide member 76, can move horizontally with neck mold 50. It will also be noted that pistons 34ª, 35ª, to which plungers 34, 35 are attached, are mounted in sleeves 180, 181 and that these pistons and the inner sleeves are constrained to move with each other. Hence, because of the connections of the neck molds with the plunger guide members, the guide supports and the inner sleeves, the common axis of these elements is movably adjustable to accommodate itself to horizontal movement of the neck molds.

The neck molds 50 and 51 are adapted only for freedom of horizontal radial movement along a radial line through the center of the turret 18, but they are not provided with any means whereby they may move in a horizontal direction at right angles to this radial line of motion. Thus, from the above it should be apparent that the neck molds provide alignment along the horizontal radial line and the blank mold holders are designed to have freedom of movement at right angles to said radial line and to accommodate themselves to the positioning of the neck molds. Thus there is provided a parison forming unit in which the blank mold has freedom of movement in one direction only, and in which the neck mold has freedom of movement in one direction only and with these movements being at right angles to each other. From the preceding it should be apparent that the point where the two lines of mold movement cross thus becomes a geometric point about which the molds close for their registration prior to molding the glass therein.

In this instant invention the glass molding machine is illustrated as a press and blow machine adapted to receive charges of molten glass in the mold cavities 14 and 15. The press plungers 34 and 35 are adapted to be then projected into the molten glass to press the parisons to hollow form. As these press plungers 34 and 35 move upwardly into pressing position, they pass through guides 75 and 76. These guides being adapted to move with the neck molds during their initial alignment with the parison mold 13 then the openings 77 and 78 act to guide the press plungers 34 and 35 centrally of the cavities 14 and 15 in said parison mold. This guiding action provided by the openings 77 and 78 is permitted through the floating provided by inner sleeves 180 and 181 floating within outer sleeves 180ᵉ, 181ᵉ and the pistons 34ᵃ, 35ᵃ secured to the plungers and slidable within these sleeves for actuating the press plungers 34 and 35. These sleeves 180, 181 are so constructed that they can in effect, have limited movement transverse to their vertical center lines and thus, in any desired horizontal direction. Thus, regardless of where the neck mold may be positioned, the floating of these sleeves 180 and 181 permits the plungers 34 and 35 to always move upwardly to pressing position in vertical alignment with the cavities 14, 15, 50, and 51.

Modifications may be resorted to within the spirit and scope of the appended claims.

We claim:

1. In an apparatus for aligning glass molding and shaping elements for molding molten glass, the combination of a base, a pair of blank mold halves having a common fulcrum mounted on said base, each half having a cavity formed therein, a glass forming insert half in each cavity, said blank mold halves and insert halves being movable about said fulcrum in an arcuate path into closed position, the meeting faces of all of said halves being disposed in a plane radial to said fulcrum, a rotatable table supported by said base, a pair of neck mold halves carried by said table and cooperating with said blank mold halves, each of said neck mold halves being relatively movable horizontally relative to said blank mold halves, means on said table restraining the horizontal movement of said neck mold halves in a direction transverse to said radial plane whereby said neck mold halves move only parallel to said radial plane, a vertically reciprocable pressing plunger, a piston for moving said plunger into the space between said inserts, a cylinder accommodating said piston, means supporting said cylinder for limited horizontal movement transverse to the axis thereof, means supported by said cylinder for guiding said plunger, said guide means cooperating with said neck molds to move therewith, means for effecting relative horizontal movement of said insert halves in a direction normal to said radial plane into closed relation, and means for locking said blank mold halves in closed relation.

2. Apparatus as in claim 1 in which the means for locking said blank mold halves are separate from the means for effecting relative movement of the insert halves, both said means being fluid operated and being controlled by common valve means.

References Cited in the file of this patent

UNITED STATES PATENTS

| | | |
|---|---|---|
| 650,722 | Jones et al. | May 29, 1900 |
| 1,931,375 | Cook et al. | Oct. 17, 1935 |
| 2,366,066 | Slick | Dec. 26, 1944 |
| 2,508,890 | Rowe | May 23, 1950 |